(No Model.) 3 Sheets—Sheet 1.
J. D. SCHOONMAKER.
BUTTONHOLE ATTACHMENT FOR SEWING MACHINES.
No. 549,538. Patented Nov. 12, 1895.
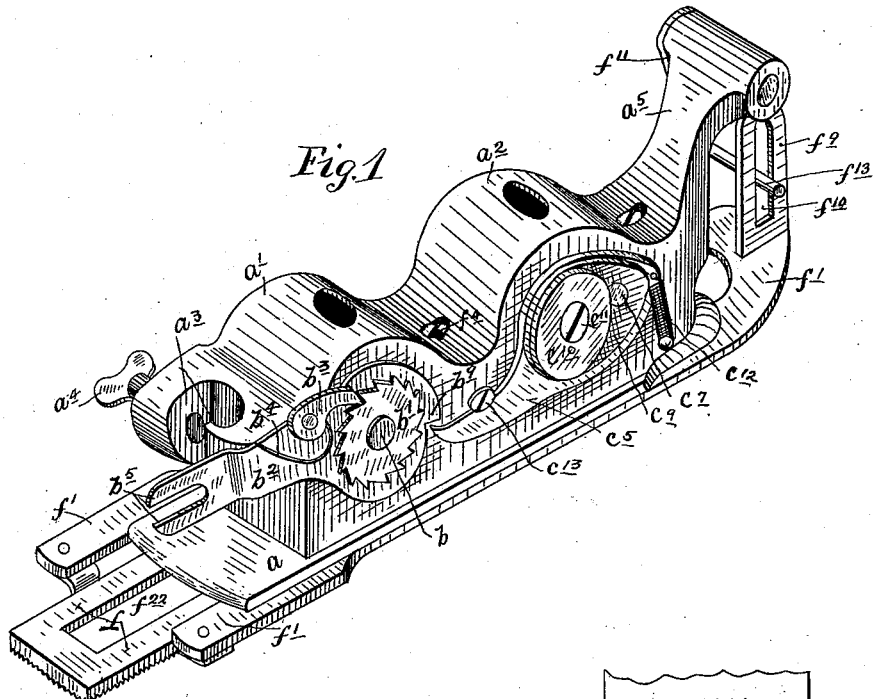
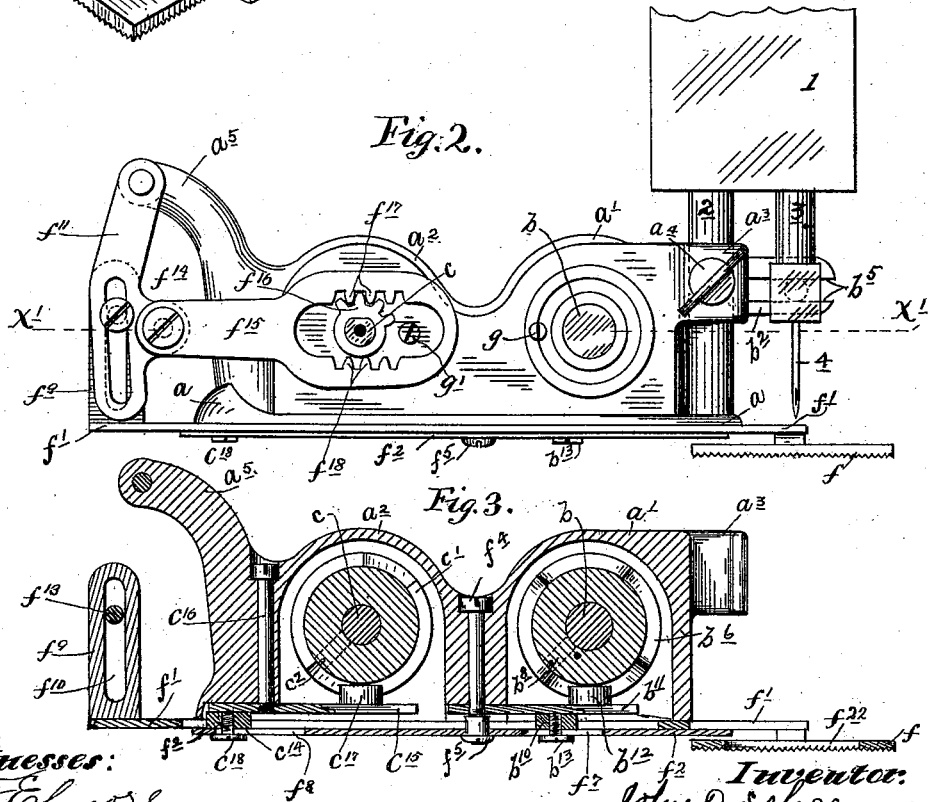
Witnesses:
E. F. Elmore
C. F. Kilgore
Inventor:
John D. Schoonmaker
By his Attorney
Jas. F. Williamson (No Model.) 3 Sheets—Sheet 2.
J. D. SCHOONMAKER.
BUTTONHOLE ATTACHMENT FOR SEWING MACHINES.
No. 549,538. Patented Nov. 12, 1895.
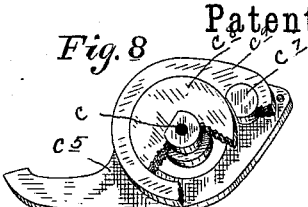
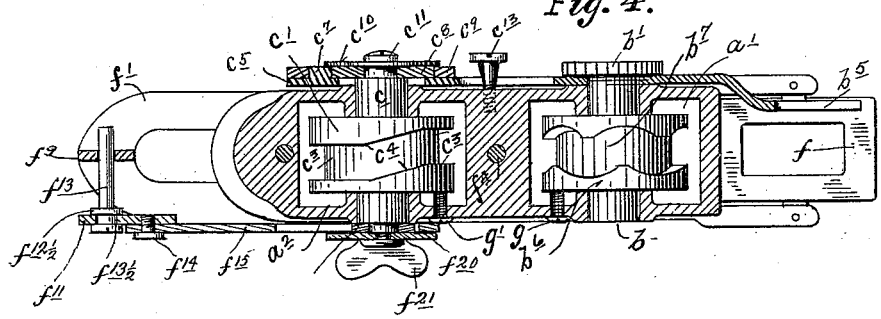
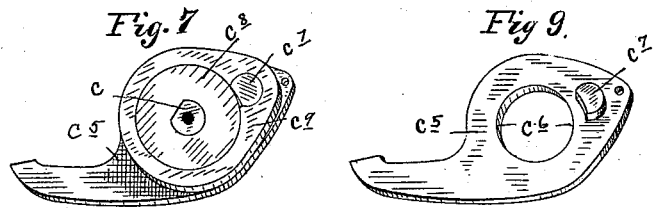
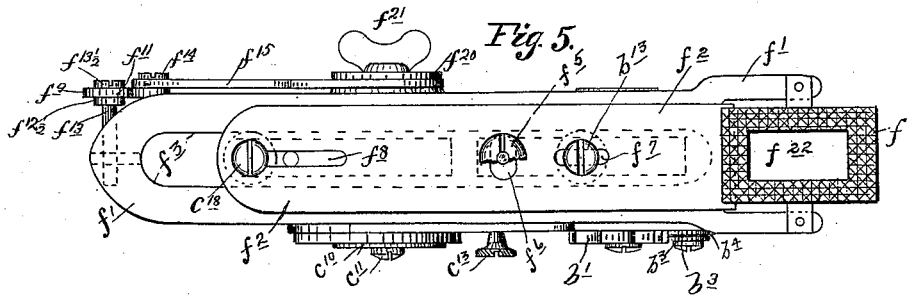
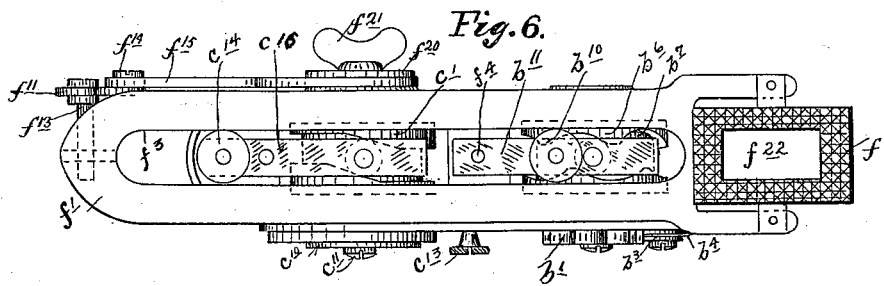
Witnesses:
E. F. Elmore
C. F. Kilgore
Inventor:
John D. Schoonmaker
By his Attorney
Jas. F. Williamson (No Model.)

J. D. SCHOONMAKER.
BUTTONHOLE ATTACHMENT FOR SEWING MACHINES.

No. 549,538.  Patented Nov. 12, 1895.

Witnesses:
E. F. Elmore
C. F. Kilgore

Inventor.
John D. Schoonmaker
By his Attorney.
Jas. F. Williamson

UNITED STATES PATENT OFFICE.

JOHN D. SCHOONMAKER, OF CHICAGO, ILLINOIS, ASSIGNOR TO THE LENOX MANUFACTURING COMPANY, OF JERSEY CITY, NEW JERSEY.

BUTTONHOLE ATTACHMENT FOR SEWING-MACHINES.

SPECIFICATION forming part of Letters Patent No. 549,538, dated November 12, 1895.

Application filed January 19, 1894. Serial No. 497,448. (No model.)

*To all whom it may concern:*

Be it known that I, JOHN D. SCHOONMAKER, a citizen of the United States, and a resident of the city of Chicago, county of Cook, State of Illinois, have invented a certain new and useful Improvement in Buttonhole Attachments for Sewing-Machines; and I do hereby declare the following to be a full, clear, and exact description of the said invention, such as will enable others skilled in the art to which it appertains to make and use the same, reference being had to the accompanying drawings.

My invention has for its object to provide a sewing-machine attachment which shall be especially adapted for working buttonholes, but shall also be capable of use for tacking pockets, crotches, or other seams.

To this end my invention consists in certain novel devices and combinations of devices, which will be hereinafter fully described, and be defined in the claims.

The accompanying drawings illustrate my invention, wherein, like letters and figures referring to like parts throughout—

Figure 10:
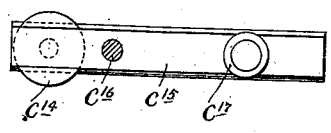
Figure 11:
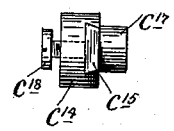
Figure 12:
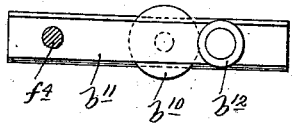
Figure 13:
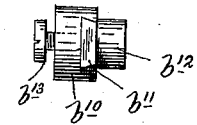

Figure 1 is a perspective view of the attachment. Fig. 2 is a side elevation of the same, shown as applied to the presser-foot and needle-bar of the sewing-machine. Fig. 3 is a central vertical longitudinal section through the entire device. Fig. 4 is a horizontal section on the line $X'X'$ of Fig. 2. Fig. 5 is a bottom plan view of the device with some parts broken away. Fig. 6 is a bottom plan view of the device with the bottom or retaining plate removed. Figs. 7 and 8 are perspective views of the clutch-lever and its co-operating parts for operating the switching cam-wheel detached, and Fig. 9 is a perspective view of the said clutch-lever detached. Figs. 10 and 11 are views, respectively in plan and end elevation, showing one of the dovetailed levers with cross-head and roller carried thereby; and Figs. 12 and 13 are similar views, respectively in plan and end elevation, showing another of the levers with its cross-head and roller.

$a$ $a'$ $a^2$ represent, respectively, the bed and body portion of the main frame of the device. The body portions $a'$ $a^2$ are constructed integral with or permanently secured to the bed portion $a$ and constitute casings for the vibrating and the switching cam-wheels, respectively, as will more fully later appear. The forward end of the casing $a'$ is provided with a pair of jaws $a^3$, one of which is fitted with a jam-screw $a^4$ for clamping the device to the presser-foot bar of the sewing-machine. The casing $a^2$ has formed integral therewith a rearward extension $a^5$, for a purpose which will be noted later on.

In the casing $a'$ is journaled a shaft $b$, one end of which projects beyond the casing and has fixed thereto a ratchet-wheel $b'$. On the said shaft $b$, between the casing $a'$ and the ratchet-wheel $b'$, is loosely pivoted a lever $b^2$, having a pawl $b^3$, which is held by spring $b^4$ in engagement with the ratchet-wheel $b'$. The said lever $b^2$ has at its forward end a pair of jaws $b^5$, adapted to engage over the needle set-screw and be secured thereby to the needle-bar of the sewing-machine.

When the device is in working position, it will appear, in respect to the sewing-machine head 1, the presser-bar 2, and needle-bar 3, as shown in Fig. 2, with the body or frame of the device securely clamped to the presser-foot bar and the lever $b^2$ secured to the needle-bar. Hence under the action of the needle-bar the lever $b^2$ will receive an up-and-down rocking motion, and, through the pawl $b^3$ and the ratchet-wheel $b'$, will impart a step-by-step rotary motion in a constant direction to the shaft $b$. On the said shaft $b$, within the casing $a'$, is mounted a cam-wheel $b^6$, having a peripheral zigzag cam-channel $b^7$, as shown best in Fig. 4, and fixed to the shaft $b$ by a set-screw $b^8$, as shown in Fig. 3, or in any other suitable way.

In the casing $a^2$ is mounted a shaft $c$, both ends of which project beyond the casing. On this shaft $c$ is mounted a cam-wheel $c'$, which is fixed to the shaft by a set-screw $c^2$, as shown in Fig. 3, or in any other suitable way, and is provided with a peripheral cam-channel $c^3$ $c^4$, which is constructed with two straight sections and two camming sections, the former of which are marked $c^3$ and the latter of which are marked $c^4$, and the relations of which parts are clearly shown in Fig. 4. The camming sections $c^4$ of this wheel $c'$ are directly opposite to each other, are comparatively short, and incline or run at opposite angles to each other in respect to the axis of the cam-wheel and shaft. This brings the straight sections $c^3$ of the said cam-wheel in different but parallel planes with respect to each other and with the centers thereof on opposite sides of the center of the cam-wheel. The function of the cam-wheel $b^6$, in the forward casing $a'$, is to impart the vibratory motion to the cloth-clamp, as will presently appear, and the function of the cam-wheel $c'$, in the rear casing $a^2$, is to impart to the cloth-clamp slide a shifting movement at its fulcrum-point when at the opposite limits of its longitudinal feed, or, in other words, when at the opposite ends of the buttonhole, for shifting the cloth as required to bring the needle 4 into proper position for working the opposite sides of the buttonhole, as will later be more fully noted.

On the end of the shaft $c$, in the rear casing $a^2$, corresponding to the ratchet-wheel end of the forward shaft $b$, is mounted a friction-clutch device for imparting a step-by-step movement to the said shaft $c$ and the switching cam-wheel $c'$ from the same pivoted lever $b^2$ which imparts the step-by-step rotary motion, as hitherto described, to the forward shaft $b$. This friction-clutch is best shown in Figs. 1, 4, 7, 8, and 9. Having regard thereto, a lever $c^5$ is provided with a central passage $c^6$, adapted to fit over the body of the shaft $c$, with some clearance between the two parts, and is provided with a clutch-stud $c^7$, which is cut away on one side, as best shown in Figs. 7, 8, and 9. When in position on the shaft $c$, the forward end of the lever $c^5$ is engaged by a shoulder $b^9$ on the rear end of the pivoted lever $b^2$. The projecting end of the shaft $c$ is reduced and flattened on one side and is engaged outward of the lever $c^5$ by a clutch-disk $c^8$, having a passage of corresponding shape for engagement with the flat-sided shaft end $c$, so as to make the said parts engage with a wrench-like action and lock the same to turn together. A clutch ring or strap $c^9$ fits over the disk $c^8$ and the clutch-lug $c^7$ of the lever $c^5$. The passage in the ring $c^9$ for the clutch-lug $c^7$ opens into the passage of said ring for the disk $c^8$ All the said parts $c^5$ $c^8$ $c^9$ are held in proper working position by a washer $c^{10}$ and set-screw $c^{11}$, which is tapped into a screw-threaded seat in the end of the shaft $c$. The rear end of the lever $c^5$ is connected by a coiled spring $c^{12}$ to the body of the frame. The spring $c^{12}$ tends to hold the forward end of the lever $c^5$ in its uppermost position against a stop-screw $c^{13}$, which is provided with a beveled stem and may therefore be adjusted to vary the throw of the lever $c^5$. Having regard to the action of this clutch device, the clutch-stud $c^7$ and its seat in the ring or strap $c^9$ constitute the fulcrum for the lever $c^5$, and hence in virtue of the way in which the clutch-stud $c^7$ is cut, as shown in Figs. 7, 8, and 9, the upper corner of said clutch-stud will be turned into engagement with the clutch-disk $c^8$ and will draw the clutch-ring $c^9$ onto the said disk with a clamping action on the downstroke of the forward end of the lever $c^5$, and thereby lock the disk $c^8$, ring $c^9$, and the lever $c^5$ to turn together for one step or during the downstroke of the lever $c^5$. When the forward end of the lever $c^5$ is released or permitted to return by the reverse motion of the lever $b^2$, the spring $c^{12}$ will pull down the rear end of the lever $c^5$ and throw the forward end upward to its limit against the stop-screw $c^{13}$, and in this movement of the lever $c^5$, under the action of the spring $c^{12}$, the clutch-lug $c^7$ will ride free from the clutch-disk $c^8$, and hence the clutch-ring $c^9$, as well as the lever $c^5$, will turn freely on the shaft $c$ and the disk $c^8$ and bring the clutch-lug $c^7$ in position for its next forward stroke. In this way the switching-cam is rotated in a constant direction with a step-by-step motion, the extent of which may be slightly varied by the beveled or cam action stem of the stop-screw $c^{13}$.

The cloth-clamp $f$ is rigidly secured to the forward end of a longitudinally-slotted plate $f'$. The plate $f'$ is held in position between the bed-plate $a$ of the frame and a retaining or clamping plate $f^2$. The slot $f^3$ extends nearly the entire length of the plate $f'$ and is engaged by a pair of cross-heads $b^{10}$ and $c^{14}$, respectively. The cross-head $b^{10}$ has dovetailed engagement with and slides on a cam-lever $b^{11}$, located within the casing $a'$ and provided with a projection $b^{12}$, which may be in the form of a stud and roller engaging the peripheral channel $b^7$ of the cam-wheel $b^6$ from below. The lever $b^{11}$ is pivoted to the main frame on the long screw $f^4$, as best shown in Fig. 3, the lower end of which works through both of the plates $f'$ and $f^2$ and is engaged by a screw-headed nut $f^5$, which co-operates with some other parts to hold the said plates $f'$ and $f^2$ in their proper working position relative to each other. The stem of the nut $f^5$ works through a lateral slot $f^6$ in the clamping or retaining plate $f^2$, so as to permit the two plates $f'$ and $f^2$ to move freely in the lateral direction in respect to the said screw $f^4$ and nut $f^5$. The cross-head $b^{10}$ on the lever $b^{11}$ may be secured in any desired position on said lever by a set-screw $b^{13}$, which works through a longitudinal slot $f^7$ in the retaining-plate $f^2$ and is tapped into the cross-head $b^{10}$, so as to clamp the same against the lever $b^{11}$.

The cross-head $c^{14}$ is adjustable on a lever $c^{15}$, which is pivoted intermediate its extremities by the bolt-screw $c^{16}$, as best shown in Fig. 3. The forward end of the lever $c^{15}$ extends under the switching cam-wheel $c'$, and is provided with a projection $c^{17}$, which may be in the form of a stud and roller engaging with the peripheral channel $c^3$ $c^4$ of said cam-wheel $c'$. The cross-head $c^{14}$ is securable in any desired position on the lever $c^{15}$ by a set-screw $c^{18}$, which works through a longitudinal slot $f^8$ in the retaining-plate $f^2$, and is tapped through the cross-head, so as to bear against the said lever $c^{15}$. By the screw-headed nut $f^5$ engaging the screw-bolt $f^4$ and the set-screws $b^{13}$ and $c^{18}$ engaging the respective cross-heads $b^{10}$ and $c^{14}$ the cloth-clamp plate $f'$ is held between the retaining-plate $f^2$ and the bed-plate $a$ of the frame, with freedom for longitudinal sliding motion in virtue of its longitudinal slot $f^3$, and both of said plates $f'$ and $f^2$ are held together by the set-screws $b^{13}$ and $c^{18}$, with freedom for a lateral motion crosswise of the frame in virtue of the slot $f^6$ and the parts $f^4$ $f^5$.

The rear end of the cloth-clamp plate $f'$ is provided with a vertical arm $f^9$, having a slot $f^{10}$. To the frame projection $a^5$ is pivoted a lever $f^{11}$, having a longitudinal slot $f^{12}$. In said slot $f^{12}$ is mounted a screw-ended stud $f^{13}$, having a collar $f^{12\frac{1}{2}}$ and a jam-nut $f^{13\frac{1}{2}}$, engaging the screw-threaded end of said stud and serving to clamp the said stud to the said lever $f^{11}$ in any desired position in the slot $f^{12}$. The stem of the stud $f^{13}$ engages with the slot $f^{10}$ in the arm $f^9$, rising from the cloth-clamp slide. The lever $f^{11}$ is pivotally connected, as shown at $f^{14}$, to a slotted double-rack pitman $f^{15}$, as shown best in Fig. 2. On the switching cam-shaft $c$, at the end of the same, opposite the friction-clutch device, is fixed a segmental pinion $f^{16}$, which at opposite points in its revolution engages with the respective racks $f^{17}$ and $f^{18}$, cut on the upper and lower edges of the slot $f^{19}$ in the rack-pitman $f^{15}$. The said pitman-rack $f^{15}$ and the segmental pinion $f^{16}$ are located on a reduced part of the said shaft $c$, external of the casing $a^2$, and are held in position with respect to each other by a washer $f^{20}$ and a thumb-screw $f^{21}$, which engages with a screw-threaded seat in the end of the shaft $c$. The projecting end of the shaft $c$ is flattened on one side, and the passage for the same in the segmental pinion $f^{16}$ is made of corresponding shape, so that the said parts will engage with a wrench action and be locked to turn together. It is, therefore, of course, obvious that when the teeth of the pinion $f^{16}$ are engaging with the ratchet-teeth $f^{17}$, the cloth-clamp slide will be moved in one direction and when the said teeth of the said pinion are in engagement with the rack-teeth $f^{18}$ that the cloth-clamp plate or slide $f'$ will be moved in the opposite direction. It is equally obvious that at the opposite ends of its stroke the cloth-clamp slide $f'$ will stand still, while the segmental pinion $f^{16}$ turns through the idle parts of its path.

All the parts of the device have now been specified and it only remains to trace the action of the same.

When the device is applied to the sewing-machine, as hitherto indicated, and as illustrated in Fig. 2, the ordinary presser-foot will have been removed and will be replaced by the cloth-clamp $f$. The sewing-machine feed must also be covered, so that the cloth will be subject only to the cloth-clamp $f$. The said cloth-clamp $f$ is provided with a rectangular oblong needle-passage $f^{22}$ of the proper dimensions to afford the requisite play of the cloth in respect to the needle for the work required. Under the movement of the needle-arm the two cam-wheels $b^6$ and $c'$ will receive an intermittent or step-by-step rotary motion, but in opposite directions. The rotation of the switching cam-shaft $c$ will, through the segmental pinion $f^{16}$ and the double-rack pitman $f^{15}$ and the connections $f^{11}$ $f^{13}$ $f^9$, impart the longitudinal feed to the cloth-clamp plate $f'$ and the cloth-clamp $f$, and this motion will be automatically reversed at the opposite limits of the said rack's pitman travel and afford an interval of pause to the cloth-clamp at the opposite limits of its longitudinal motion. The extent of the longitudinal feed of the cloth-clamp at each step, and hence, likewise, the total extent of the longitudinal feed in either direction, may be varied at will by adjusting the position of the lateral stud $f^{13}$ in the feed-lever $f^{11}$. During the time that the cloth-clamp $f'$ is receiving its longitudinal feed, whether in one direction or in the other, the cross-head $c^{14}$ on the lever $c^{15}$ will be held stationary in virtue of the fact that the cam-lever projection or roller $c^{17}$ will be traveling in one or the other of the straight sections $c^3$ of the cam-channel of the switching cam-wheel $c'$. Whenever the cloth-clamp slide reaches either of its limits and during the pause while the segmental cam $f^{16}$ is moving through the idle part of its revolution the camming sections, or, rather, one of said sections $c^4$ of the switching cam-channel $c^3$ $c^4$, will move the lever $c^{15}$ and the cross-head $c^{14}$, and thereby shift the fulcrum of the cloth-clamp slide $f'$ to a different position. This occurs just at the right time required for shifting the cloth-clamp and the cloth engaged thereby from one to the other side of the buttonhole, and the interval of pause above noted at the opposite limits of the cloth-clamp's travel, together with the camming action of the switching cam-wheel on the fulcrum of said cloth-clamp plate, are timed to come just right for working around the ends of the buttonhole. During the whole time, whether the cloth-clamp plate $f'$ be moving longitudinally or be standing still, the zigzag channel cam-wheel $b^6$, acting through the parts $b^{11}$ $b^{12}$ and the cross-head $b^{10}$, will impart to the cloth-clamp a vibratory or laterally-swinging motion, as required for the proper buttonhole stitch on the cloth. The extent of this vibration may be varied at will, as hitherto indicated, by shifting the position of the cross-head $b^{10}$ on the lever $b^{11}$.

The foregoing statements accurately describe the actions of the device or attachment when applied for working buttonholes; but the device is also capable of being applied to tack the corners of pockets, crotches, or other seams. To convert the same into a tacker, it is only necessary to dispense with the switching action of the rearmost or switching cam-wheel $c'$. This is accomplished by simply shifting the cross-head $c^{14}$ on the lever $c^{15}$ to a point where its center is in line with the axis of the screw-bolt $c^{16}$, which forms the pivot or fulcrum for the lever $c^{15}$. When that change is made, the cloth-clamp plate will receive the same longitudinal feed and the same vibratory motion at its forward or cloth-clamp end, but the rear end of the cloth-clamp slide will occupy a constant position, so far as any shifting lateral motion is concerned. Hence, instead of shifting from one to the other side, as when working a buttonhole, the fulcrum of the cloth-clamp slide will remain constant and the stitches, both on the forward and backward motion of the slide, will come in the same line.

In some of its features the device herein described involves the same principle of construction and operation as the attachment for tacking and zigzag stitching described in my pending application, Serial No. 475,168, filed May 22, 1893.

In order to prevent the cam-wheels from being turned backward by their operating-levers, I provide some kind of friction devices for bearing against the said cam-wheels, and I have shown for that purpose in this case set-screws $g$ and $g'$, which are tapped through the casing and bear at their ends, respectively, one against the end of each of the said cam-wheels, as clearly shown in Fig. 4.

It should be especially noted in regard to this device that it is securable to the presser-foot bar of the sewing-machine and when in working position moves with the presser-foot bar. This permits the cloth in which the buttonhole is being worked to be manipulated in any direction in precisely the same manner that cloth may be manipulated under the ordinary action of the sewing-machine. Hence the buttonholes may be worked so as to stand in any desired direction.

It will, of course, be understood that minor details of the construction might be changed without departing from the spirit of my invention.

Having now fully described my invention, I hereby declare that what I claim, and desire to secure by Letters Patent of the United States, is as follows:

1. In a sewing machine attachment, the combination with a cloth clamp slide, of a double rack pitman, connected with said slide, a rotary shaft receiving motion from the needle bar, and a segmental pinion driven by said shaft and alternately engageable with the racks of said pitman, the pitch line of which pinion is equal in diameter to the distance between the pitch lines of said racks, substantially as described.

2. In a sewing machine attachment, the combination with a cloth clamp slide, of a pitman connected to said slide and provided with a longitudinal slot having rack teeth cut on the inner face edges of said slot, a rotary shaft receiving motion from the needle bar and projecting into the slot of said pitman, and the segmental pinion, on said shaft, within said slot and alternately engageable with said teeth and idle when turning from one set of said teeth to the other, at the ends of the slot, substantially as and for the purpose set forth.

3. In a sewing machine attachment, the combination with a cloth clamp slide, of a rotary shaft, receiving motion from the needle bar, the segmental pinion on said shaft, a slotted double rack pitman, the slot of which embraces said pinion to permit the racks to be alternately engaged thereby, and adjustable stroke levers connecting said pitman with said cloth clamp slide, substantially as described.

4. In a sewing machine attachment, the combination with a cloth clamp slide, and a rotary shaft receiving motion from the needle bar, of a segmental pinion on said shaft, a double rack slotted pitman, the slot of which embraces the said pinion and the teeth of which are alternately engageable by said pinion, a slotted arm rising from the cloth clamp and a slotted lever, pivoted to the frame and also pivotally connected to said pitman, and an adjustable stud, connecting said lever and said arm through the slots therein, and securable in any desired position on said lever, for varying the longitudinal feed of the cloth clamp slide, substantially as described.

5. In a sewing machine attachment, the combination with a slotted cloth clamp slide mounted for sliding and vibratory motion on the frame of the device, an oscillator cam wheel receiving motion from the needle bar and having a peripheral zigzag cam channel, a pivoted lever having a projection working in said cam channel and provided with an adjustable cross head engaging the slot of said clamp slide, a switching cam wheel having a peripheral cam channel constructed with two straight sections and two camming or inclined sections, a pivoted lever having a projection engaging the channel of said switching cam wheel, and an adjustable cross head on said switching lever, engaging the slot of said cloth clamp slide, substantially as described.

6. In a sewing machine attachment, the combination with the slotted cloth clamp slide mounted for longitudinal and vibratory motion, of the switching cam wheel receiving motion from the needle bar, the pivoted lever subject to the action of said cam wheel, and the adjustable cross head on said pivoted lever engaging the slot of said cloth clamp slide and securable on said lever at any point, either in line with the lever's fulcrum, or remote therefrom, for converting the device from a buttonhole worker into a pocket tacker &c., or vice versa, substantially as described.

7. In a sewing machine attachment, the combination with the oscillating and switching cam wheels, of the pivoted lever receiving motion from the needle bar and provided with a pawl engaging a ratchet wheel on the oscillator cam wheel shaft, and the friction clutch device on the switching cam wheel shaft operated by said pawl-bearing lever on the oscillator cam wheel shaft, and an adjustable stop for the lever member of the friction clutch device, whereby the switching cam wheel may be driven from the same device driving the oscillator cam wheel but with a step of different length, when desired, substantially as described.

8. In a sewing machine attachment, the combination with a suitable case or support, of a cloth clamp slide, mounted for sliding and vibratory motion on said frame, and a pair of vibrating levers, operated from the needle-bar, provided with cross-heads, engaging slots in said cloth slide, at least one of which cross-heads is adjustable and adapted to be moved onto the pivotal center of its said lever, whereby the device may be converted from a buttonhole worker into a pocket or seam tacker, or vice versa, substantially as described.

JOHN D. SCHOONMAKER.

Witnesses:
ARTHUR D. SEATON,
O. H. MCCONOUGHEY.